United States Patent
Usukura et al.

(10) Patent No.: US 8,279,377 B2
(45) Date of Patent: Oct. 2, 2012

(54) LIQUID CRYSTAL DISPLAY DEVICE

(75) Inventors: Naru Usukura, Osaka (JP); Toshiyuki Yoshimizu, Osaka (JP); Seishi Kosegawa, Osaka (JP); Tadashi Nemoto, Osaka (JP); Takehiro Murao, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 197 days.

(21) Appl. No.: 12/988,216

(22) PCT Filed: Jan. 23, 2009

(86) PCT No.: PCT/JP2009/000256
§ 371 (c)(1),
(2), (4) Date: Oct. 15, 2010

(87) PCT Pub. No.: WO2009/128187
PCT Pub. Date: Oct. 22, 2009

(65) Prior Publication Data
US 2011/0025956 A1 Feb. 3, 2011

(30) Foreign Application Priority Data
Apr. 16, 2008 (JP) ................................. 2008-106472

(51) Int. Cl.
G02F 1/1335 (2006.01)
G09F 13/04 (2006.01)
G02B 27/10 (2006.01)

(52) U.S. Cl. .......... 349/95; 349/112; 362/97.1; 359/619

(58) Field of Classification Search .............. 349/56, 349/95, 112, 139, 143, 144; 362/97.1, 97.2, 362/97.3, 97.4; 359/621, 625, 640, 619
See application file for complete search history.

(56) References Cited

U.S. PATENT DOCUMENTS
5,359,440 A * 10/1994 Hamada et al. ................... 349/8
(Continued)

FOREIGN PATENT DOCUMENTS
JP 2-117585 U 9/1990
(Continued)

OTHER PUBLICATIONS

International Preliminary Report on Patentability and Written Opinion of the International Searching Authority, dated Dec. 9, 2010, for Application No. PCT/JP2009/000256 (Forms PCT/IB/338, PCT/IB/373 and PCT/ISA/237).

*Primary Examiner* — Brian Healy
(74) *Attorney, Agent, or Firm* — Birch, Stewart, Kolasch & Birch, LLP

(57) ABSTRACT

A liquid crystal display device of high image quality is provided at a low cost, in which the viewing angle is restricted only in a specific direction. A liquid crystal display device of the present invention, which has a plurality of pixels in a matrix arrangement, includes: a first substrate; a second substrate; a liquid crystal layer interposed between the first substrate and the second substrate; and a plurality of microlenses provided on a surface of the first substrate which is opposite to the liquid crystal layer, the microlenses being arranged so as to correspond to the plurality of pixels, and each of the microlenses having a curved surface configured to collect incoming light, wherein d satisfies the following relationship: $d > p \cdot ((2n)^2 - 1)^{1/2}$ where d is a thickness of the first substrate, p is an arrangement pitch of the plurality of pixels, and n is a refractive index of the major material of the first substrate.

18 Claims, 3 Drawing Sheets

U.S. PATENT DOCUMENTS

| | | | |
|---|---|---|---|
| 5,680,186 A * | 10/1997 | Watanabe et al. | 349/95 |
| 5,764,318 A * | 6/1998 | Kurematsu et al. | 349/5 |
| 7,292,391 B2 * | 11/2007 | Shimizu | 359/460 |
| 7,646,452 B2 | 1/2010 | Nakanishi et al. | |
| 2002/0085287 A1 * | 7/2002 | Egawa | 359/619 |
| 2006/0014085 A1 | 1/2006 | Nakajima et al. | |
| 2008/0218433 A1 * | 9/2008 | Hong et al. | 345/6 |
| 2009/0115939 A1 * | 5/2009 | Ikuta et al. | 349/95 |
| 2011/0025956 A1 * | 2/2011 | Usukura et al. | 349/95 |
| 2011/0164036 A1 * | 7/2011 | De Zwart et al. | 345/419 |

FOREIGN PATENT DOCUMENTS

| | | |
|---|---|---|
| JP | 4-175726 A | 6/1992 |
| JP | 11-194332 A | 7/1999 |
| JP | 11-223711 A | 8/1999 |
| JP | 2005-196139 A | 7/2005 |
| WO | WO 2007/010764 A1 | 1/2007 |

* cited by examiner

LIQUID CRYSTAL DISPLAY DEVICE

TECHNICAL FIELD

The present invention relates to a liquid crystal display device and specifically to a liquid crystal display device which includes a microlens array.

BACKGROUND ART

In recent years, liquid crystal display devices are widely used as display devices for monitors, projectors, mobile information terminals, mobile phones, and the like. Generally speaking, a liquid crystal display device allows the transmittance (or reflectance) of a liquid crystal display panel to vary with a driving signal, thus modulating the intensity of light from a light source for irradiating the liquid crystal display panel, whereby images and text characters are displayed. Liquid crystal display devices include direct-viewing type display devices in which images or the like that are displayed on the liquid crystal display panel are directly viewed, projection-type display devices (projectors) in which images or the like that are displayed on the display panel are projected onto a screen through a projection lens in an enlarged size, and so on.

By applying a driving voltage which corresponds to an image signal to each of the pixels that are in a regular matrix arrangement, a liquid crystal display device causes a change in the optical characteristics of a liquid crystal layer in each pixel, and regulates the transmitted light using optical elements disposed on the front and rear sides of the liquid crystal layer, such as polarizers, thereby displaying images, text characters, and the like. In the case of a direct-viewing type liquid crystal display device, the optical elements are usually attached respectively to a light-entering substrate (the rear substrate) which is provided on the backlight side of the liquid crystal display panel and a light-outgoing substrate (the front substrate or viewer-side substrate).

Methods for applying an independent driving voltage for each pixel include a passive matrix type and an active matrix type. Among these, on a liquid crystal panel of the active matrix type, switching elements and wiring lines for supplying driving voltages to the pixel electrodes need to be provided. As switching elements, non-linear 2-terminal devices such as MIM (metal-insulator-metal) devices and 3-terminal devices such as TFT (thin film transistor) devices are in use.

Liquid crystal display devices are also used as display devices for use in onboard devices, such as car navigation devices, instrument panels, etc., as well as television sets, personal computers, and mobile phones. In onboard applications, for safety and other reasons, display devices are required to produce no reflection of images on the windshield.

With the view of meeting such a requirement, Patent Document 1 describes the technique of restricting visible angles of images by means of a louver film which is attached as a light control film to an onboard display device.

Patent Document 2 describes a liquid crystal display device in which, with the view of improving the light utilization efficiency of the liquid crystal display device, microlenses are provided over a liquid crystal display panel for collecting light onto corresponding pixels, whereby the effective aperture ratio of the liquid crystal display panel is improved.

Patent Document 3 describes a method of forming such microlenses with high accuracy. The microlenses of Patent Document 3 are formed by irradiating a photocurable resin applied over a substrate with light incoming from a color filter substrate side via pixel apertures and thereafter performing photolithography processes including development, heating, etc. The irradiation step employs a so-called self-alignment exposure method in which the incidence angle of light transmitted through the pixel apertures is changed during exposure. This exposure method enables microlenses to be formed so as to correspond to respective pixels in a self-aligning fashion (formation of microlenses by a self-alignment method) and therefore does not require alignment of a mask for forming microlenses. Thus, the pixel apertures and the microlens array can be aligned with extremely high accuracy.

Patent Document 1: Japanese Laid-Open Utility Model Publication No. 2-117585
Patent Document 2: Japanese Laid-Open Patent Publication No. 11-194332
Patent Document 3: Japanese Laid-Open Patent Publication No. 2005-196139 (Japanese Patent No. 3708112)

DISCLOSURE OF INVENTION

Problems to be Solved by the Invention

To reduce the reflection of images on the windshield, it is necessary to reduce the amount of display light (emitted light) traveling from the display surface of the liquid crystal display device to the windshield, i.e., it is necessary to reduce the amount of display light traveling upward from the display surface. The present inventor conducted research on the positional relationship between a display device and a windshield in common vehicles and found that the reflection of images can be effectively reduced by reducing the brightness of light emitted in a direction defined by azimuthal angle 0° and polar angle 30° to not more than 10% of the peak brightness (front brightness) and reducing the brightness for polar angle 45° or more to not more than 2%, where the upward direction from the display surface (the direction to the windshield) is azimuthal angle 0° and the direction normal to the display surface is polar angle 0°.

Also, to provide excellent display not only to a driver but also to other passengers in the vehicle (especially, passengers in the backseats), it is necessary to restrict the upward viewing angle as described above while increasing the viewing angles in the rightward and leftward directions of the display surface (directions of azimuthal angles 90° and 270°) to perform display with high brightness and high contrast ratio.

Such a viewing angle restriction may possibly be realized by using the above-described light control film. However, the light control film is very expensive. If it is used, the liquid crystal display device would disadvantageously become expensive. When the light control film is used, the decrease in brightness due to the transmittance of the film would disadvantageously be about 10%.

The present inventor also conducted research on using a backlight which includes reversed prisms on the light-outgoing side as a light source of the liquid crystal display device. However, when such a backlight is used, the front brightness (the brightness around polar angle 0°) is extremely high, leading to a problem that the brightness is insufficient around polar angle 30° (e.g., between 20° and 30° at which somewhat high brightness is demanded, and a problem that reduction of the brightness is insufficient at angles greater than 30°. Another problem is that sufficient viewing angles cannot be obtained in the rightward and leftward directions. As such, simply using such a backlight cannot realize a liquid crystal display device suitable for onboard applications. In actuality, none of the existing onboard liquid crystal display devices uses such a backlight.

The present invention was conceived in view of the above problems. One of the objects of the present invention is to provide a liquid crystal display device suitable for onboard applications at a relatively low price, which is capable of reducing occurrence of reflection of images and providing excellent display to viewers.

Means for Solving the Problems

A liquid crystal display device of the present invention, which has a plurality of pixels in a matrix arrangement, includes: a first substrate that is a transparent substrate; a second substrate opposing the first substrate; a liquid crystal layer interposed between the first substrate and the second substrate; and a plurality of microlenses provided on a surface of the first substrate which is opposite to the liquid crystal layer, the plurality of microlenses being arranged so as to correspond to the plurality of pixels, and each of the plurality of microlenses having a curved surface configured to collect incoming light, wherein d satisfies the following relationship: $d > p \cdot ((2n)^2 - 1)^{1/2}$ where d is a thickness of the first substrate, p is an arrangement pitch of the plurality of pixels, and n is a refractive index of the major material of the first substrate.

In one embodiment, the liquid crystal display device further includes an illuminator which is configured to emit light for display toward the plurality of microlenses, the illuminator including a light source, a light guide plate for guiding light emitted from the light source, and a prism sheet including a plurality of prisms for refracting the light guided by the light guide plate. Each of the plurality of microlenses is a lenticular lens extending in a first direction in a plane of the first substrate. Each of the plurality of prisms is a prism extending in the first direction. The illuminator further includes an anisotropic diffuser provided on a side of the plurality of prism which is closer to the plurality of microlenses or to the light guide plate, the anisotropic diffuser being configured to diffuse light emitted from the illuminator such that larger diffusion occurs in the first direction than in the other directions.

In one embodiment, the anisotropic diffuser is a layer provided on a surface of the prism sheet or the light guide plate, the layer including an anisotropic particle.

In one embodiment, the anisotropic diffuser is a raised or recessed portion formed in a surface of the prism sheet or the light guide plate, the raised or recessed portion having a shape extending in a second direction that is perpendicular to the first direction.

In one embodiment, the first direction is identical with a row or column direction of the pixel arrangement.

In one embodiment, the illuminator is a reversed prism type backlight.

In one embodiment, d and r satisfy the following relationship: $1.6r < d < 3.6r$ where r is a radius of curvature of the curved surface of the microlenses.

In one embodiment, d and r satisfy the following relationship: $2.1r < d < 3.1r$.

Effects of the Invention

According to the present invention, in a liquid crystal display device which includes microlenses, the thickness of the substrate is set to an appropriate thickness according to the pixel pitch, so that the utilization efficiency of the backlight is improved, and the emission range of display light can be restricted to a specific range. Also, the emitted light can relatively uniformly travel to different positions within the specific range, and therefore, high quality images can be provided to any viewing point within the restricted range.

The liquid crystal display device of the present invention utilizes light from a backlight which includes prisms extending in a specific first direction for display and uses lenticular lenses extending in the first direction as microlenses and therefore can provide display with a narrow viewing angle along the first direction and a wide viewing angle along the second direction that is perpendicular to the specific direction. Further, the backlight includes an anisotropic diffuser. Therefore, it is possible to provide display in which the viewing angle is not increased along the first direction, but the viewing angle is further increased along the second direction.

According to the present invention, the viewing angle can be restricted only in a desired direction without using an expensive light control film, such as a louver film. Thus, a liquid crystal display device can be provided at a lower price.

The present invention is capable of providing display light which has a restricted diffusion range in a specific direction (e.g., upward and downward directions), with the variation in brightness being small within the restricted range, and which has a wide diffusion range in a direction perpendicular to the specific direction (horizontal direction). Thus, when the present invention is applied to a liquid crystal display device for onboard applications, reflection of images is prevented, and clear display is provided through any viewing path within a specific range in the upward and downward directions, while excellent display with high brightness can be provided to all the passengers located within a wide range along the rightward and leftward directions.

Figure 1:
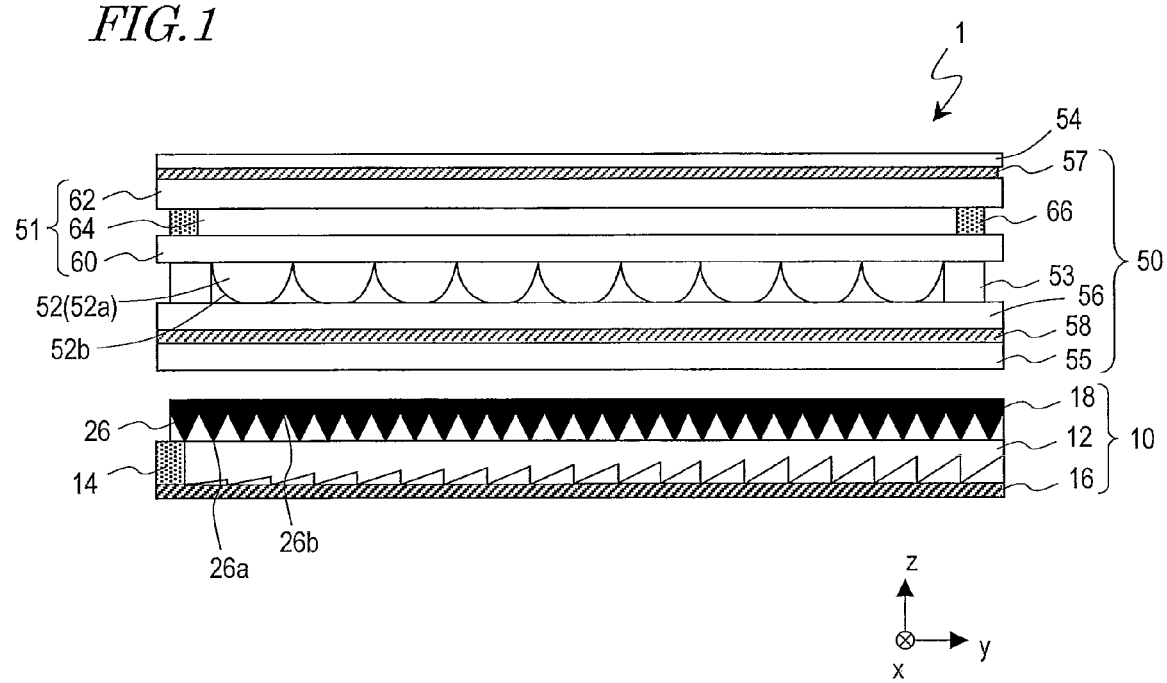
FIG. 1 A cross-sectional view schematically showing a structure of a liquid crystal display device which is an embodiment of the present invention.

DESCRIPTION OF THE REFERENCE NUMERALS 1 liquid crystal display device
10 backlight
12 light guide plate
14 light source
16 reflector
18 prism sheet
21 incoming light
22 transmitted light
26 prism
31 anisotropic particle (needle filler)
32 recessed portion (cavity)

50 liquid crystal display panel
51 laminate substrate
52 microlens array
52a microlens
52b curved surface
53 support
54 front-face side optical film
55 rear-face side optical film
56 protection layer
57, 58 adhesion layer
60 TFT substrate
61 scan line
62 counter substrate
64 liquid crystal layer
66 sealant

BEST MODE FOR CARRYING OUT THE INVENTION

Hereinafter, an embodiment of the liquid crystal display device of the present invention is described with reference to the drawings.

FIG. 1 is a cross-sectional view schematically showing a structure of a liquid crystal display device 1 of the present embodiment. The liquid crystal display device 1 is an active matrix type liquid crystal display device (LCD). As shown in the drawing, the liquid crystal display device 1 includes a liquid crystal display panel (liquid crystal display panel with microlenses) 50 and a backlight (illuminator) 10 placed under the liquid crystal display panel 50 (on the opposite side to the display surface).

The liquid crystal display panel 50 includes a laminate substrate 51 including a plurality of pixels in a matrix arrangement, a microlens array 52 including a plurality of microlenses 52a provided over a light receiving surface of the laminate substrate 51 (the bottom surface of the laminate substrate 51 which extends perpendicular to the sheet of the drawing), a support 53 provided in a perimeter region of the microlens array 52, a front-face side optical film 54 provided on the viewer side of the laminate substrate 51 (upper side of the drawing), a rear-face side optical film which is provided on the light-entering side of the microlens array 52, and a protection layer 56 interposed between the rear-face side optical film 55 and the microlens array 52.

The front-face side optical film 54 is bonded to the laminate substrate 51 via an adhesion layer 57. The rear-face side optical film 55 is bonded to the protection layer 56 via an adhesion layer 58. The front-face side optical film 54 and the rear-face side optical film 55 each include a polarization film which transmits linearly-polarized light.

The microlens array 52 is made of a photocurable resin. The microlenses 52a of the microlens array 52 are each formed by irradiating the photocurable resin via an opening of the pixel in accordance with the method described in Patent Document 3, for example, in a self-aligning fashion such that the microlenses 52a correspond to the respective pixels. Note that the microlenses 52a may be formed using another conventional method. For example, the microlenses 52a may be formed by molding of a resin with the use of a stamper.

The protection layer 56 is provided so as to be in contact with the microlens array 52 and the support 53. The protection layer 56 and the microlens array 52 are bonded together such that the protection layer 56 is in contact with the microlens array 52 only at the apex portions of the respective microlenses 52a. There are gaps between the microlens array 52 and the protection layer 56, which are filled with air. The protection layer 56 may be made of a UV-curable acrylic or epoxy resin which has high visible-light transmittance, but may alternatively be made of a thermosetting resin. The protection layer 56 and the support are preferably made of the same material as the microlenses 52a or a material which has substantially the same refractive index as that of the material of the microlenses 52a.

Since the protection layer 56 is fixed by the support 53 and the apex portions of the plurality of microlenses 52a, the liquid crystal display panel 50 has an increased strength to withstand a depressing force. Also, when a curable resin is used for the protection layer 56, the protection layer 56 and the microlens array 52 can be tightly bound without using an adhesive. Thus, even when the liquid crystal display panel 50 is subjected to a depressing force, the distance between the rear-face side optical film 55 and the microlens array 52 is maintained constant, whereby occurrence of brightness unevenness due to a change of the distance between these elements can be prevented.

The gaps between the microlens array 52 and the protection layer 56 may be filled with a material which has a different refractive index from the microlens array 52. Adopting such a configuration can increase the strength of the liquid crystal display panel 50. Alternatively, the height of the support 53 may be greater than that of the microlens array 52 such that the protection layer 56 is supported only by the support 53, although the strength decreases.

A configuration which does not include the protection layer 56 is also adoptable. In this case, however, the adhesion layer 58 would be in contact with the microlens array 52. When the liquid crystal display panel 50 is subjected to a depressing force, there is a probability that the adhesive would enter the gaps of the microlens array 52 to cause a problem, such as display unevenness. With the protection layer 56 provided as in the present embodiment, occurrence of such a problem can be prevented.

The laminate substrate 51 includes a TFT substrate (first substrate) 60 which has TFTs in respective pixels, a counter substrate (second substrate) 62 which is a color filter substrate (CF substrate), and a liquid crystal layer 64. The liquid crystal layer 64 includes a liquid crystal material encapsulated between the TFT substrate 60 and the counter substrate 62 and is tightly sealed by a sealant 66 provided at the perimeter.

Each of the microlenses 52a is a lenticular lens extending in the column direction of the pixels that are provided in a matrix arrangement over the laminate substrate 51 (x-direction that is perpendicular to the sheet of the drawing: first direction). Each of the microlenses 52a has a curved surface 52b on its side closer to the backlight 10 for collecting incoming light. The width of each microlens 52a along the y-direction of the drawing is identical with the width of the pixel along the row direction (y-direction), i.e., the pixel pitch. The pixel pitch is, for example, about 330 μm.

The backlight 10 is an edge light type backlight which uses a turning lens (TL) or a reversed prism (RP). As shown in FIG. 1, the backlight 10 includes a light guide plate 12, a light source 14 such as an LED, cathode ray tube, or the like, which is placed on one side surface of the light guide plate 12, a reflector 16 placed under the light guide plate 12, and a prism sheet 18 placed over the light guide plate 12 (on the liquid crystal panel side).

The lower part of the light guide plate 12, which faces to the reflector 16, has saw-tooth grooves. As a result, the bottom surface of the light guide plate 12 has a plurality of slope surfaces which have different slope angles. Here, the plurality of slope surfaces are shaped such that a slope surface which is more distant from the light source 14 has a greater slope angle. The prism sheet 18 has a plurality of prisms 26 which are downwardly tapered.

Part of the light emitted from the light source 14 which is incident on the bottom surface and the upper surface of the light guide plate 12 with an angle equal to or greater than the critical angle is totally reflected by these surfaces. On the other hand, another part of the light which is incident on the bottom surface and the upper surface with an angle smaller than the critical angle is partially reflected, while the remaining part is refracted and output from the bottom surface or the upper surface. The light output from the bottom surface is reflected by the reflector 16 to again enter the light guide plate 12, while the light output from the upper surface advances toward the prism sheet 18. With such a setup, light propagating in the light guide plate 12 is gradually emitted toward the prism sheet 18 while repeatedly undergoing reflection and refraction.

Light that is incident on the prism sheet 18 is refracted by the prisms 26 and then emitted toward the liquid crystal display panel 50. Here, the prisms 26 are extending in the same direction as the longitudinal direction of the microlenses 52a (x-direction). Therefore, the light emitted from the prism sheet 18 provides a restricted viewing angle (i.e., the light is near to collimated light) in the y-z plane and provides an unrestricted viewing angle in the x-z plane so that larger diffusion occurs in polar angle directions.

With only the prisms 26, however, the viewing angle characteristics that are required of onboard liquid crystal display devices cannot be sufficiently achieved. Specifically, with only the prisms 26, as shown by curve a in FIG. 5, the front brightness in the y-z plane (brightness around polar angle)0° is extremely high while, accordingly, the brightness is insufficient in the polar angle range of about 20° to 30°, and the brightness is not sufficiently reduced at angles greater than 30°. The viewing angle is secured to some extent in the x-z plane, but such a viewing angle is insufficient to provide excellent display to all the passengers in the vehicle.

To solve this problem, in the liquid crystal display device 1 of the present embodiment, the microlenses 52a, the TFT substrate 60, and the backlight 10 includes countermeasures which will be described below.

Figure 2:
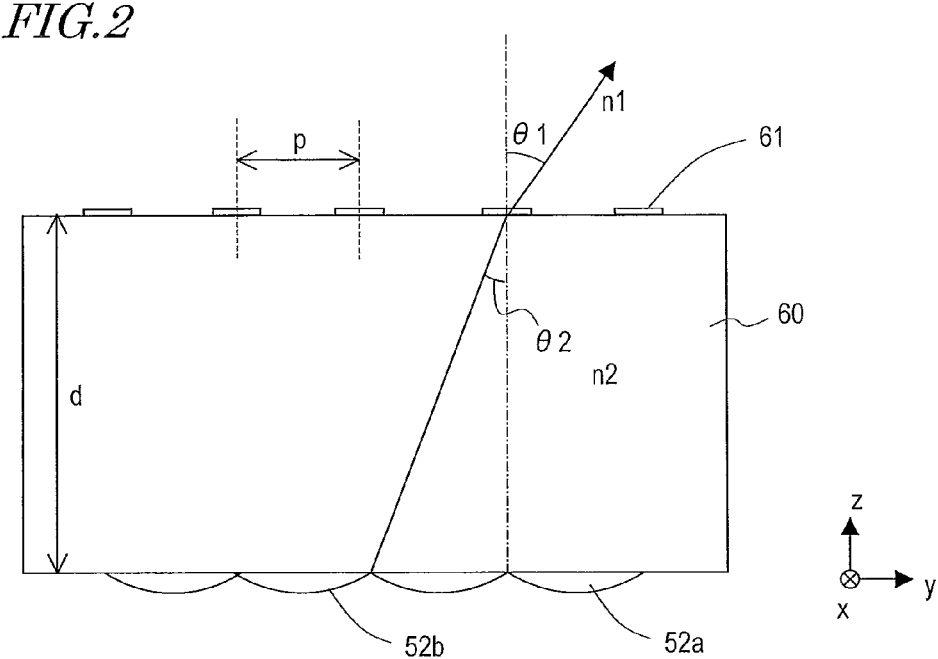
FIG. 2 A diagram schematically showing a cross-section of microlenses and a TFT substrate according to an embodiment of the present invention, together with an optical path of a light ray transmitted through the microlenses and the TFT substrate.

FIG. 2 is a diagram schematically showing a cross-section of the microlenses 52a and the TFT substrate 60 of the liquid crystal display device 1, in which an optical path of a light ray transmitted through the microlenses 52a and the TFT substrate 60 is schematically shown together.

As shown in FIG. 2, a surface of the TFT substrate 60 which is closer to the liquid crystal layer 64 is provided with a plurality of scan lines 61. The scan lines 61 are running in the x-direction over the boundaries between the pixels, i.e., over the boundaries between the microlenses 52a. The interval of the scan lines 61 along the y-direction is identical with the pixel pitch along the y-direction, i.e., 330 µm. Note that FIG. 2 only shows elements which are significant in determining the optical path of transmitted light, while the other elements that are provided on the side of the TFT substrate 60 which is closer to the liquid crystal layer 64, such as signal lines, auxiliary capacitance lines, pixel electrodes, etc., are not shown.

In the present embodiment, the thickness of the TFT substrate 60, d, is 700 µm. The radius of curvature of the curved surface 52b of the microlenses 52a, r, is 270 µm (approximately d/2.6). The pixel pitch along the y-direction, p, is 330 µm. Note that the thickness d refers to the thickness of a transparent layer in the TFT substrate 60. As for the TFT substrate 60, when large part of its thickness is occupied by a glass substrate, the thickness d can be assumed as the thickness of the glass substrate.

Here, the focal length of the microlenses 52a, f, depends on the thickness of the microlenses 52a, the refractive index of the lens material, and the radius of curvature r. Since in the present embodiment the thickness of the microlenses 52a is about 10 µm, and the refractive index of the lens material is about 1.6, the relationship of f≈2.6r holds between the focal length f and the radius of curvature r. In terms of improving the light utilization efficiency, the focal point of the microlenses 52a is desirably in the vicinity of a surface of the TFT substrate 60 which is closer to the liquid crystal layer 64. Thus, the present embodiment is configured such that the thickness d of the TFT substrate 60 is equal to the focal length f, i.e., 2.6 times the radius of curvature.

In consideration of the thickness and material of the microlenses 52a which can be employed in common liquid crystal display devices and the tolerance for the difference between the focal length f and the thickness d, the thickness d of the TFT substrate 60 is preferably in the range of 1.6r<d<3.6r. When the thickness d is in the range of 2.1r<d<3.1r, the light utilization efficiency can be further improved.

The liquid crystal display device 1 of the present embodiment is designed such that the maximum emission angle $\theta_1$ of the light which is collected by the microlenses 52a and emitted from the TFT substrate 60 is about 30°. According to the Snell's Law, the following relationship holds:

$$n_1 \cdot \sin \theta_1 = n_2 \cdot \sin \theta_2$$

where $n_2$ is the refractive index of the TFT substrate 60 (the refractive index of a transparent material of, for example, the glass substrate in the TFT substrate 60), $n_1$ is the refractive index of air that is a medium through which the emitted light propagates (=1.0), and $\theta_2$ is the maximum incidence angle of the light which is collected by the microlenses 52a to be incident on the upper surface of the TFT substrate 60. According to the relationship of the trigonometric ratio, the following relationship holds:

$$\sin \theta_2 = P/(p^2+d^2)^{1/2}.$$

Therefore, with $n_1$=1.0 and $\theta_1$=30°, d is obtained from the above relationships as shown below:

$$d = p \cdot ((2n_2)^2 - 1)^{1/2}.$$

To meet the thus-obtained relationship between d and p, in the present embodiment, the thickness d of the TFT substrate 60 is 700 µm, the pixel pitch p is 330 µm, and the refractive index $n_2$ of the major material (transparent material) of the TFT substrate 60 is 1.6.

In the liquid crystal display device 1 which is designed as described above, the maximum emission angle $\theta_1$ of the emitted light in the y-z plane can be set to 30°. Considering that the emitted light has been once collected by the microlens array 52, the emitted light cannot be collimated light but diffused light with the maximum emission angle of 30°. Thus, the brightness of emitted light which can be obtained from the liquid crystal display device 1 moderately changes in the polar angle range from −30° to 30° without a prominent brightness peak, as compared with a case where the microlenses 52a are not provided. This advantage of the present embodiment will be further described later with reference to FIG. 5.

Note that the maximum emission angle $\theta_1$ may be set to an angle different from 30°, for example, specific angle $\theta_x$ which is not greater than 30° in some applications. Even in such a case, the relationship between d and p may be:

$$d > p \cdot (2n_2)^2 - 1)^{1/2}$$

so that the brightness of the emitted light is increased only in a specific range (greater than $-\theta_x$ and smaller than $\theta_x$) without occurrence of a prominent brightness peak in the specific range. With such an arrangement, the liquid crystal display device is capable of providing excellent images to a viewer located at any position in the specific range, with reduced reflection of the images.

Next, the structure of the backlight 10 according to the embodiment of the present invention is described in more details.

Figure 3:
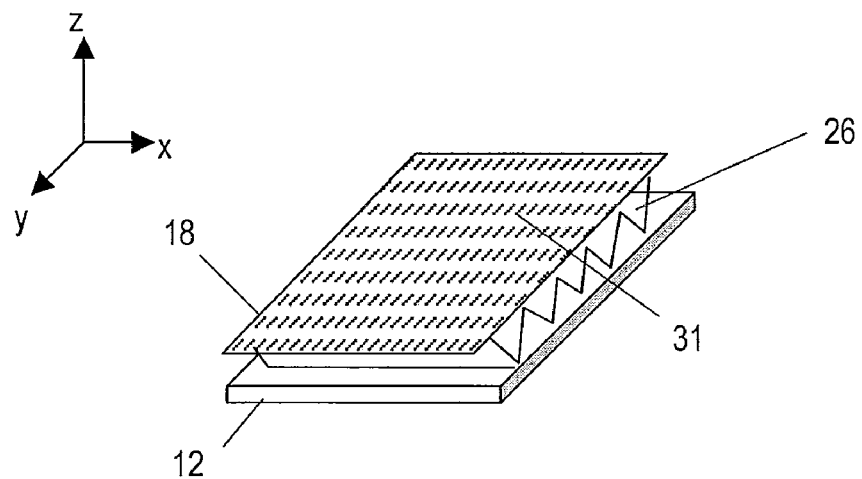
FIG. 3 A perspective view showing a prism sheet which includes anisotropic particles according to an embodiment of the present invention.

FIG. 3 is a perspective view showing the structure of the backlight 10 according to the embodiment of the present invention. As shown, the prism sheet 18 of the backlight 10 includes an anisotropic light diffusion layer which includes a plurality of anisotropic particles 31. The anisotropic particles 31 are, for example, a needle filler.

The prism sheet 18 having such a configuration can be obtained by, for example, applying an adhesive material containing the needle filler 31 over the upper surface of the prisms 26 (a surface closer to the microlens array 52). The adhesive material desirably has high optical transparency. For example, the adhesive material may be an acrylic adhesive material. Examples of the major constituent of the acrylic adhesive material include an acrylic acid and an ester thereof, a methacrylic acid and an ester thereof, a homopolymer of an acrylic monomer, such as acrylamide, acrylonitrile, and the like, a copolymer of such acrylic monomers, and a copolymer of at least one acrylic monomer and a vinyl monomer, such as a vinyl acetate, a maleic anhydride, a styrene, and the like.

Preferably, the needle filler 31 has a different refractive index from that of the adhesive material and has the shape of a needle (including the shape of a fiber) of a high aspect ratio. Also, the needle filler 31 is preferably achromatic or white in order to prevent transmitted light from being tinted. Preferable examples of the needle filler 31 include a needle-shaped or fiber-shaped materials which are composed of a metal oxide, such as titanium oxide, zirconium oxide, zinc oxide, a metal compound, such as boehmite, aluminum borate, calcium silicate, basic magnesium sulfate, calcium carbonate, potassium titanate, glass, synthetic resin, or the like. As to the size of the needle filler 31, for example, the long axis is 2 to 5000 μm, and the short axis is 0.1 to 20 μm. More preferably, the long axis is 10 to 300 μm, and the short axis is 0.3 to 5 μm.

An example method of fabrication of the prism sheet includes preparing a filler-containing adhesive composition in which the needle filler 31 is dispersed in an adhesive material, and applying the prepared composition over the prism sheet 18, before removing a solvent by drying. Further, when necessary, the prism sheet 18 may be cured in an environment at room temperature or about 30 to 60° C. for about one day to two weeks in order to harden or stabilize the constituents of the adhesive material.

When the filler-containing adhesive composition is applied over the sheet, the needle filler 31 is oriented such that its long axis substantially extend along the direction of application of the composition due to a shear force exerted on the filler-containing adhesive composition. Thus, the orientation of the needle filler 31 can be set depending on the direction of application of the composition. The degree of the orientation of the needle filler can be adjusted depending on the size of the needle filler, the viscosity of the filler-containing adhesive composition, the method and speed of application of the composition, etc. The thickness of a filler-containing layer formed of the filler-containing adhesive composition is, for example, 1 to 50 μm, and more preferably 10 to 30 μm.

Alternatively, the prism sheet 18 provided with the needle filler 31 may be fabricated by mixing the needle filler 31 into a UV-curable or thermosetting, acrylic or epoxy resin, applying the resultant resin that contains the needle filler 31 over the prism sheet 18, and hardening the resin by UV application or heating. Even when this method is employed, the orientation of the needle filler 31 can be appropriately set depending on the direction of application of the resin.

Figure 4:
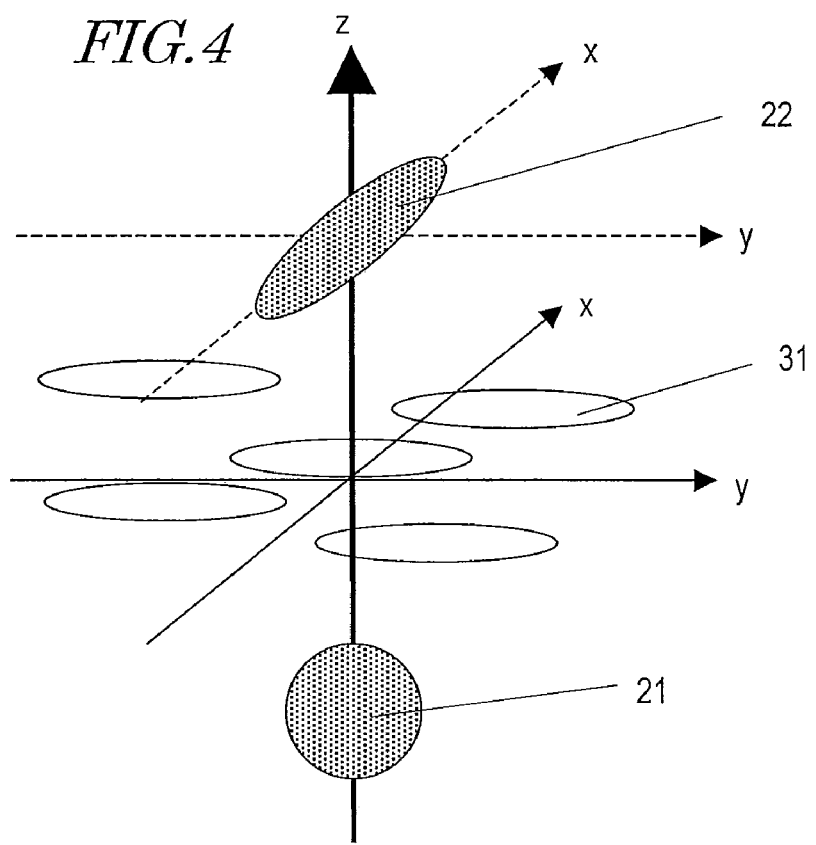
FIG. 4 A perspective view showing a light ray transmitted through the prism sheet according to an embodiment of the present invention.

FIG. 4 is a diagram illustrating diffusion of light by the anisotropic particles (needle filler) 31. When isotropic incoming light 21 enters the needle filler 31, the incoming light 21 is diffused by the needle filler 31. In this situation, the needle filler 31 does not cause much diffusion of the light 21 in the long axis direction (y-direction) but causes large diffusion of the incoming light 21 in the short axis direction (x-direction). As such, transmitted light 22, which has been transmitted through the needle filler 31, is anisotropically-diffused light with large diffusion in the x-direction and small diffusion in the y-direction. The anisotropic diffusion can be expressed by the haze value. The haze value in the x-z plane for the backlight 10 of the present embodiment is about 60%.

Thus, the light emitted from the backlight 10 provides a restricted viewing angle range in the y-direction due to the prisms 26 and provides a wider viewing angle, i.e., larger diffusion, in the x-direction. Note that a sheet equivalent to the prism sheet 18 that contains the above-described needle filler 31 may be provided over the upper surface of the light guide plate 12 (a surface of the light guide plate 12 which is closer to the prisms 26). This configuration also provides equivalent effects.

Figure 5:
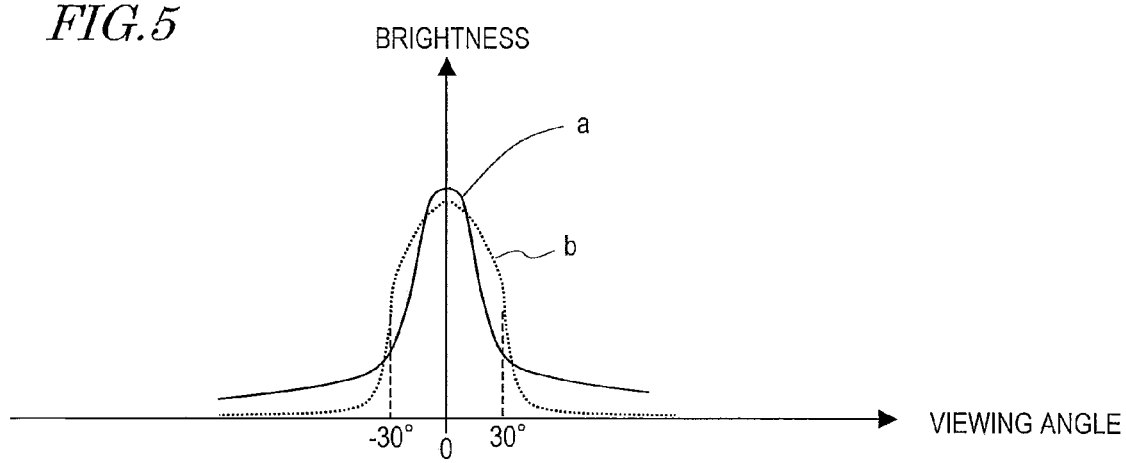
FIG. 5 A graph which illustrates diffusion of transmitted light according to an embodiment of the present invention.

FIG. 5 is a graph illustrating the viewing angle characteristics in the y-z plane of display light emitted from the liquid crystal display device 1. In FIG. 5, line a represents the viewing angle characteristic of the display light from the liquid crystal display device 1 from which the microlenses 52a are omitted. Line b represents the viewing angle characteristic of the display light from the liquid crystal display device 1 that includes the microlenses 52a.

As seen from the comparison between line a and line b, in the case where the microlenses 52a are omitted, the characteristics of the backlight 10 are reflected in the display light so that a prominent peak occurs at polar angle 0°, and the brightness sharply decreases as the angle leaves from 0°. However, in the case where the microlenses 52a are included, the brightness of the display light obtained is sufficiently high in the polar angle range from −30° to 30° (specific range) but is extremely low in the other ranges.

Thus, in the case where the microlenses 52a are omitted, the brightness may be insufficient in some regions even within the specific range, and light brighter than necessary may spread outside the specific range. However, in the case where the microlenses 52a are included, display of sufficient brightness is provided to any viewer, no matter which position the viewer is viewing the display panel from, so long as it is within the specific range, while the light propagating to the outside of the specific range is decreased.

The viewing angle characteristics of the display light in the y-z plane have been described above. In the x-z plane, a still wider viewing angle can be obtained than that of the light emitted from the backlight 10 as described with reference to FIG. 4.

The liquid crystal display device 1 of the present embodiment provides display light which has a restricted diffusion range in a specific direction (e.g., upward and downward directions), with the variation in brightness being small within the restricted range, and which has a wide diffusion range in a direction perpendicular to the specific direction (horizontal direction). Therefore, when the liquid crystal display device 1 is used in an onboard application, reflection of images is prevented, and clear display can be provided through any viewing path within the specific range, and excellent display can be provided to many passengers.

Next, a variation of the backlight 10 is described.

Figure 6:
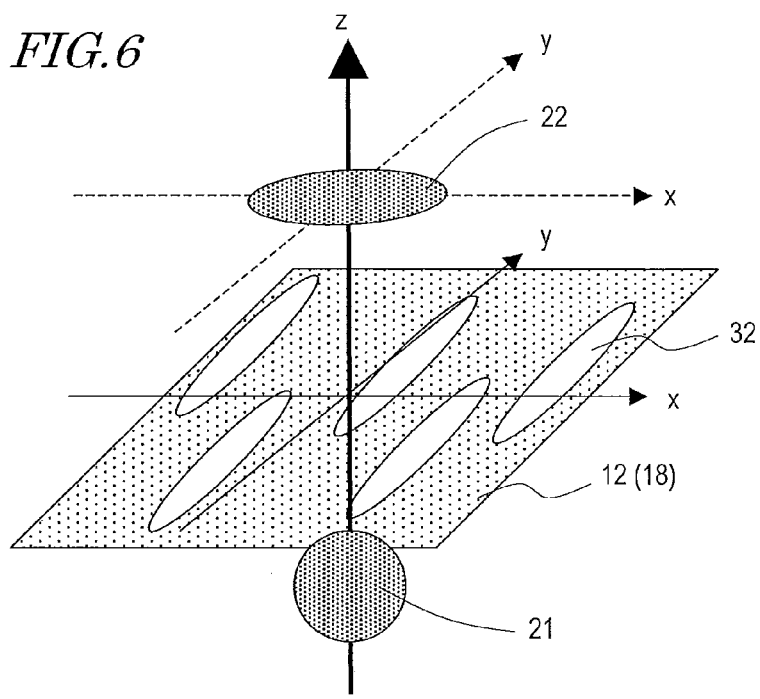
FIG. 6 A perspective view showing a light ray transmitted through a backlight of a variation of the embodiment of the present invention.

FIG. 6 shows the light guide plate 12 included in the variation of the backlight 10 and illustrates diffusion of light by the light guide plate 12. In the variation, a plurality of recessed portions (cavities) 32 having an elliptic planer shape are provided in the upper surface of the light guide plate 12 (a surface of the light guide plate 12 which is closer to the prism sheet 18), instead of the filler-containing layer formed over the prism sheet 18 as shown in FIG. 3. The recessed portions 32 are shaped such that the long axis of the ellipse extends in the y-direction, and the short axis extends in the x-direction.

The recessed portions 32 correspond to the needle filler 31 shown in FIG. 3 and cause incoming light to undergo equivalent anisotropic diffusion. Specifically, incoming light 21 is diffused by the recessed portions 32 in such a manner that the recessed portions 32 do not much diffuse the incoming light 21 in the long axis direction (y-direction) but largely diffuse the incoming light 21 in the short axis direction (x-direction). Therefore, transmitted light 22, which has been transmitted through the recessed portions 32, is anisotropically-diffused light with large diffusion in the x-direction and small diffusion in the y-direction.

Thus, the light emitted from the backlight 10 provides a restricted diffusion range in the y-direction and a wide diffusion range in the x-direction. Note that the above-described recessed portions 32 may be replaced by raised portions (protrusions) which have the same planer shape. Alternatively, the recessed portions 32 or the raised portions may be provided in the upper surface of the prism sheet. Such configurations can also provide equivalent anisotropic diffusion effects.

INDUSTRIAL APPLICABILITY

The present invention is preferably applicable to, for example, onboard displays which are required to provide display with a restricted viewing angle in a specific direction and a wide viewing angle in the other directions.

The invention claimed is:

1. A liquid crystal display device having a plurality of pixels in a matrix arrangement, comprising:
a first substrate;
a second substrate opposing the first substrate;
a liquid crystal layer interposed between the first substrate and the second substrate; and
a plurality of microlenses provided on a surface of the first substrate which is opposite to the liquid crystal layer, the plurality of microlenses being arranged so as to correspond to the plurality of pixels, and each of the plurality of microlenses having a curved surface configured to collect incoming light,
wherein d satisfies the following relationship:

$$d > p \cdot ((2n)^2 - 1)^{1/2}$$

where d is a thickness of the first substrate, p is an arrangement pitch of the plurality of pixels, and n is a refractive index of the first substrate.

2. The liquid crystal display device of claim 1, further comprising,
an illuminator which is configured to emit light for display toward the plurality of microlenses, the illuminator including a light source, a light guide plate for guiding light emitted from the light source, and a prism sheet including a plurality of prisms for refracting the light guided by the light guide plate, wherein
each of the plurality of microlenses is a lenticular lens extending in a first direction in a plane of the first substrate,
each of the plurality of prisms is a prism extending in the first direction, and
the illuminator further includes an anisotropic diffuser provided on a side of the plurality of prism which is closer to the plurality of microlenses or to the light guide plate, the anisotropic diffuser being configured to diffuse light emitted from the illuminator such that larger diffusion occurs in the first direction than in the other directions.

3. The liquid crystal display device of claim 2, wherein the anisotropic diffuser is a layer provided on a surface of the prism sheet or the light guide plate, the layer including an anisotropic particle.

4. The liquid crystal display device of claim 2, wherein the anisotropic diffuser is a raised or recessed portion formed in a surface of the prism sheet or the light guide plate, the raised or recessed portion having a shape extending in a second direction that is perpendicular to the first direction.

5. The liquid crystal display device of claim 2, wherein the first direction is identical with a row or column direction of the pixel arrangement.

6. The liquid crystal display device of claim 2, wherein the illuminator is a reversed prism type backlight.

7. The liquid crystal display device of claim 1, wherein d and r satisfy the following relationship:

$$1.6r < d < 3.6r$$

where r is a radius of curvature of the curved surface of the microlenses.

8. The liquid crystal display device of claim 7, wherein d and r satisfy the following relationship:

$$2.1r < d < 3.1r.$$

9. The liquid crystal display device of claim 3, wherein the first direction is identical with a row or column direction of the pixel arrangement.

10. The liquid crystal display device of claim 4, wherein the first direction is identical with a row or column direction of the pixel arrangement.

11. The liquid crystal display device of claim 3, wherein the illuminator is a reversed prism type backlight.

12. The liquid crystal display device of claim 4, wherein the illuminator is a reversed prism type backlight.

13. The liquid crystal display device of claim 5, wherein the illuminator is a reversed prism type backlight.

14. The liquid crystal display device of claim 2, wherein d and r satisfy the following relationship:

$$1.6r < d < 3.6r$$

where r is a radius of curvature of the curved surface of the microlenses.

15. The liquid crystal display device of claim 3, wherein d and r satisfy the following relationship:

$$1.6r < d < 3.6r$$

where r is a radius of curvature of the curved surface of the microlenses.

16. The liquid crystal display device of claim 4, wherein d and r satisfy the following relationship:

$$1.6r < d < 3.6r$$

where r is a radius of curvature of the curved surface of the microlenses.

17. The liquid crystal display device of claim 5, wherein d and r satisfy the following relationship:

$$1.6r<d<3.6r$$

where r is a radius of curvature of the curved surface of the microlenses.

18. The liquid crystal display device of claim 6, wherein d and r satisfy the following relationship:

$$1.6r<d<3.6r$$

where r is a radius of curvature of the curved surface of the microlenses.

* * * * *